(12) United States Patent
Song et al.

(10) Patent No.: US 11,242,094 B2
(45) Date of Patent: Feb. 8, 2022

(54) ONE-WAY PLUG

(71) Applicants: Hyundai Motor Company, Seoul (KR); Kia Motors Corporation, Seoul (KR)

(72) Inventors: Won-Jung Song, Seoul (KR); Jai-Hak Kim, Gunpo-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 30 days.

(21) Appl. No.: 16/844,469

(22) Filed: Apr. 9, 2020

(65) Prior Publication Data

US 2021/0179194 A1 Jun. 17, 2021

(30) Foreign Application Priority Data

Dec. 16, 2019 (KR) .......................... 10-2019-0167785

(51) Int. Cl.
*B62D 25/24* (2006.01)
*F16K 5/02* (2006.01)
(52) U.S. Cl.
CPC ............ *B62D 25/24* (2013.01); *F16K 5/0207* (2013.01)
(58) Field of Classification Search
CPC .............................. B62D 24/24; F16K 15/148
USPC ........................................................ 296/1.06
See application file for complete search history.

(56) References Cited

U.S. PATENT DOCUMENTS

| 5,709,309 A | * | 1/1998 | Gallagher | B62D 25/24 |
| | | | | 137/849 |
| 7,390,043 B2 | * | 6/2008 | Kraus | B62D 25/24 |
| | | | | 215/355 |
| 8,371,789 B2 | | 2/2013 | Takita | |
| 9,435,453 B1 | * | 9/2016 | Shen | F16K 15/147 |
| 2017/0121953 A1 | * | 5/2017 | Benesh | E03F 5/041 |
| 2019/0093812 A1 | * | 3/2019 | Yamada | F16L 55/1612 |
| 2019/0382055 A1 | * | 12/2019 | Sato | B62D 25/24 |
| 2020/0343117 A1 | * | 10/2020 | Eggum | H01L 21/67769 |

FOREIGN PATENT DOCUMENTS

| DE | 102007026543 A1 | * | 12/2008 | ............. B62D 25/24 |
| DE | 102009026222 A1 | * | 2/2011 | ......... F16K 27/0209 |
| DE | 202015102591 U1 | * | 9/2015 | ............. B62D 25/24 |
| DE | 102016102443 A1 | * | 8/2017 | ............. B62D 25/24 |
| DE | 102016010124 A1 | * | 2/2018 | ............. B62D 25/24 |
| EP | 0976598 A1 | * | 2/2000 | ............. B60K 15/04 |
| FR | 2859971 A1 | * | 3/2005 | ............. B62D 25/24 |
| JP | H0243373 A | | 2/1990 | |
| JP | H09196053 A | | 7/1997 | |
| JP | 2001124205 A | | 5/2001 | |
| KR | 101347048 B1 | | 1/2014 | |

(Continued)

*Primary Examiner* — D Glenn Dayoan
*Assistant Examiner* — Kevin P Weldon
(74) *Attorney, Agent, or Firm* — Slater Matsil, LLP

(57) ABSTRACT

A one-way plug includes a housing including a plate, an upper stopper having an overlap part extending downward from a side of the plate, and a lower body having a sealing surface part formed to extend in a cylindrical shape with a hollow downward from the plate, and a valve body provided in the hollow of the lower body and configured to cover the hollow, and having a wing part elastically deformed and configured to open the hollow.

18 Claims, 6 Drawing Sheets

(56) References Cited

FOREIGN PATENT DOCUMENTS

| | | | |
|---|---|---|---|
| KR | 20150071138 A | 6/2015 | |
| KR | 20180100552 A | 9/2018 | |
| WO | WO-2006134477 A2 * | 12/2006 | ............. B62D 25/24 |

* cited by examiner

-PRIOR ART-

-PRIOR ART-

ONE-WAY PLUG

CROSS-REFERENCE TO RELATED APPLICATIONS

This application claims priority to Korean Patent Application No. 10-2019-0167785, filed on Dec. 16, 2019, which application is hereby incorporated herein by reference.

TECHNICAL FIELD

The present disclosure relates to a one-way plug.

BACKGROUND

FIG. 1 shows a state where a one-way plug 10 has been mounted to a vehicle body (B), and FIG. 2 shows a partial cross-sectional shape.

The one-way plug 10 is for sealing a drain hole (D) formed in the vehicle body (B) to prevent Noise, Vibration and Harshness (NVH) and water infiltration from a vehicle exterior, and to discharge water inside the vehicle to the outside.

An upper stopper 11 is fastened in contact with the upper surface of the vehicle body (B), adjusts the assembly depth, and prevents detachment, and a drainage path is formed.

For drainage, a sealing surface needs to be lower than the upper surface of the vehicle body (B). When a vehicle body cut surface 12 is set to the sealing surface, the sealing surface may inappropriately become higher than the upper surface of the vehicle body (B) due to the tolerance and the cut surface height (1 mm or less). Accordingly, the one-way plug 10 has a structure mismatched with the surface.

A lower stopper 13 adjusts the assembly depth and prevents detachment, and furthermore, requires sealing performance. Accordingly, the lower stopper 13 needs to increase in size, and is overlapped and matched with the vehicle body (B) in a certain section.

In addition, a valve 14 is made of an elastic material and deformed to the vehicle exterior to discharge water, and a valve stopper 15 suppresses the valve 14 so that the valve 14 is not deformed inward.

Such a one-way plug 10 shares the lower stopper 13 as the sealing surface. However, in order to secure the sealing performance, the lower stopper 13 needs to sufficiently overlap with the vehicle body (B) and requires a larger diameter than the drain hole (D) considering the assembly tolerance.

In addition, as shown in the drawing, when assembling the one-way plug 10 from the upper portion to the lower portion of the vehicle body (B), the lower stopper 13 having such a characteristic may not pass through the drain hole (D) and a pressing force is also increased.

If the lower stopper 13 is reduced in size in order to improve assemble-ability, the sealing performance of the plug is lowered.

As a result, the one-way plug 10 has a limited assembly direction from the lower portion to the upper portion of the vehicle body (B), and accordingly, may not be applied to a closed section shown.

The contents described in the Background are to help the understanding of the background of the present disclosure, and may include what is not previously known to those skilled in the art to which the present disclosure pertains.

SUMMARY

The present disclosure relates to a one-way plug. Particular embodiments relate to a one-way plug mounted to a vehicle interior.

The present disclosure is intended to solve problems. An embodiment of the present disclosure provides a one-way plug capable of being assembled from the upper portion of a vehicle body downward, and being applied to a closed section.

A one-way plug according to one embodiment of the present disclosure includes a housing including a plate, an upper stopper including an overlap part extending downward from the side of the plate, and a lower body having a sealing surface part formed to extend in a cylindrical shape with a hollow downward from the plate, and a valve body provided in the hollow of the lower body to be able to cover the hollow, and having a wing part elastically deformed to be able to open the hollow.

In addition, the plate is formed with an upper discharge hole penetrated vertically.

In addition, the upper discharge hole is divided and formed in plural in the plate, and the upper stopper may further include a valve support part extending downward from the center of the plate, and formed with a vertical hole in the longitudinal direction.

In addition, the sealing surface part is formed with a side discharge hole to the side.

In addition, the lower portion of the sealing surface part is formed with a groove part having a smaller diameter than that of the sealing surface part along the outer circumference.

In addition, the lower portion of the sealing surface part is formed with a valve stopper protruding in the hollow direction.

Furthermore, the upper stopper may further include a valve support part extending downward from the center of the plate, and formed with a vertical hole in the longitudinal direction, and the valve body may further include a wing support part extending upward from the center of the wing part and inserted into the vertical hole of the valve support part.

In addition, the valve body may further include a sealing surface part contacting the outer circumference of the sealing surface part of the lower body and a lower stopper part formed on the lower portion of the sealing surface part and having a shape protruding and expanding inward and outward with respect to the sealing surface part, respectively.

The lower stopper part is inserted into the groove part.

In addition, the heights of the sealing surface part of the lower body and the sealing surface part of the valve body are the same.

Meanwhile, when inserted into a drain hole formed in a vehicle body, the overlap part overlaps with the upper surface of the vehicle body, and the upper surfaces of the sealing surface part of the lower body and the sealing surface part of the valve body are spaced at a certain interval apart from the upper surface of the vehicle body to form a step.

In particular, the valve body is formed integrally with the housing by double injection.

In addition, the valve body is made of a softer material than that of the housing.

According to the one-way plug of embodiments of the present disclosure, by forming the sealing surface to the side wall, it is possible to reduce the size of the lower stopper part, thereby securing the assemble-ability from the upper portion to the lower portion of the vehicle.

In addition, although there is conventionally no overlap between the upper stopper and the vehicle body, it is possible to add the H directional overlap of the upper stopper according to the change in such an assembly direction, thereby improving the assembly location.

In addition, it is possible to form the drainage path in the upper portion of the sealing surface and add the inclination, thereby improving the water trap inside the plug.

Accordingly, it is possible to apply the one-way plug to the place where the lower assembly is not possible, thereby improving the watertight performance, and being applicable to the closed section.

DETAILED DESCRIPTION OF ILLUSTRATIVE EMBODIMENTS

In order to fully understand the present disclosure, the operational advantages of the present disclosure, and the objects achieved by carrying out the present disclosure, reference should be made to the accompanying drawings which exemplify preferred embodiments of the present disclosure and the contents described in the accompanying drawings.

In describing the preferred embodiments of the present disclosure, publicly-known techniques or repeated descriptions which may unnecessarily obscure the subject matter of the present disclosure will be briefly explained or omitted.

Figure 1:
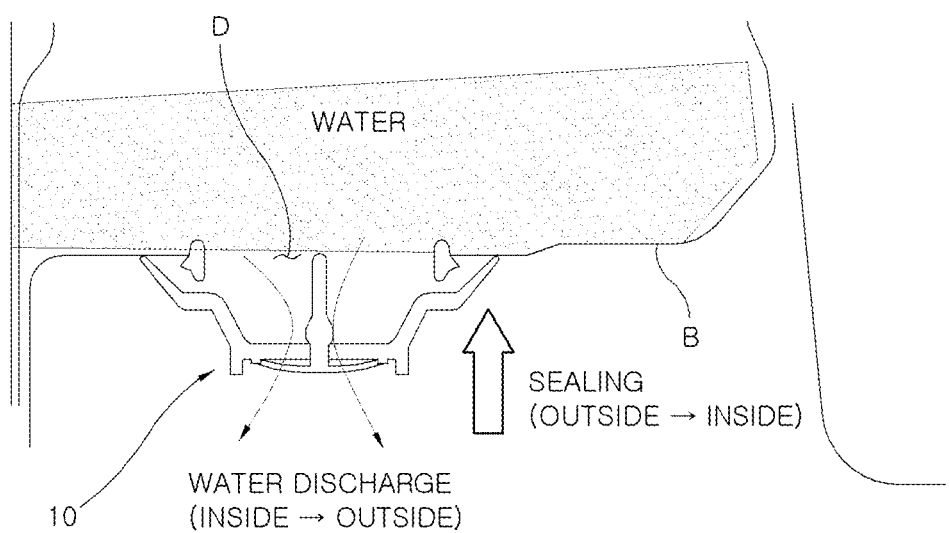
FIG. 1 is a diagram showing a state where a conventional one-way plug has been mounted.
Figure 2:
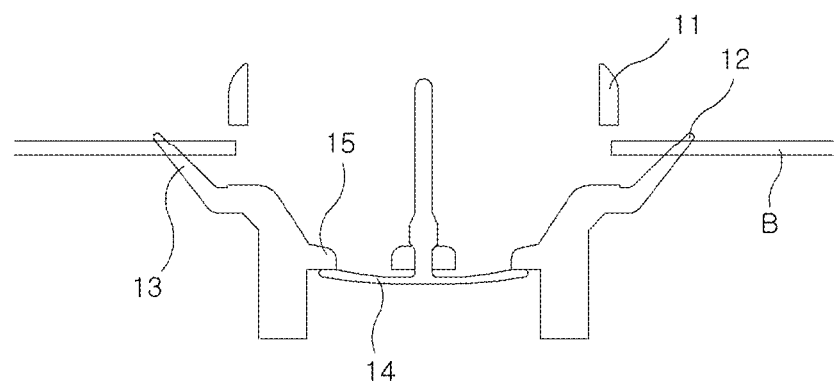
FIG. 2 is an enlarged diagram showing a portion of FIG. 1.
Figure 3:
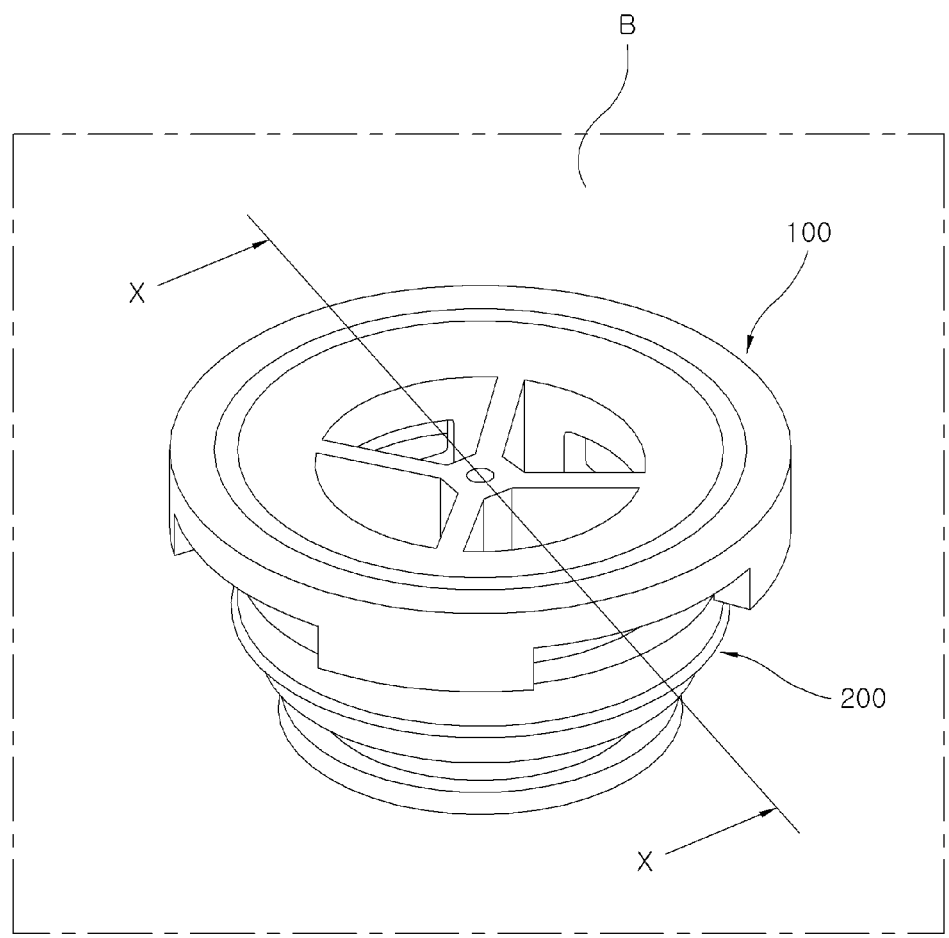
FIG. 3 is a diagram showing a one-way plug in accordance with embodiments of the present disclosure.
Figure 4:
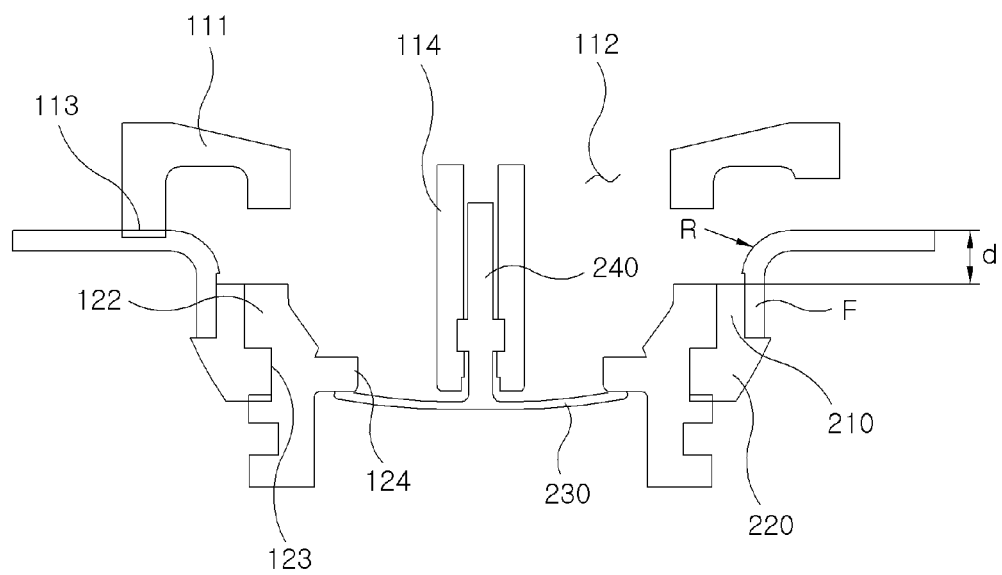
FIG. 4 is a diagram showing a cross-sectional shape taken along line X-X of FIG. 3.
Figure 5:
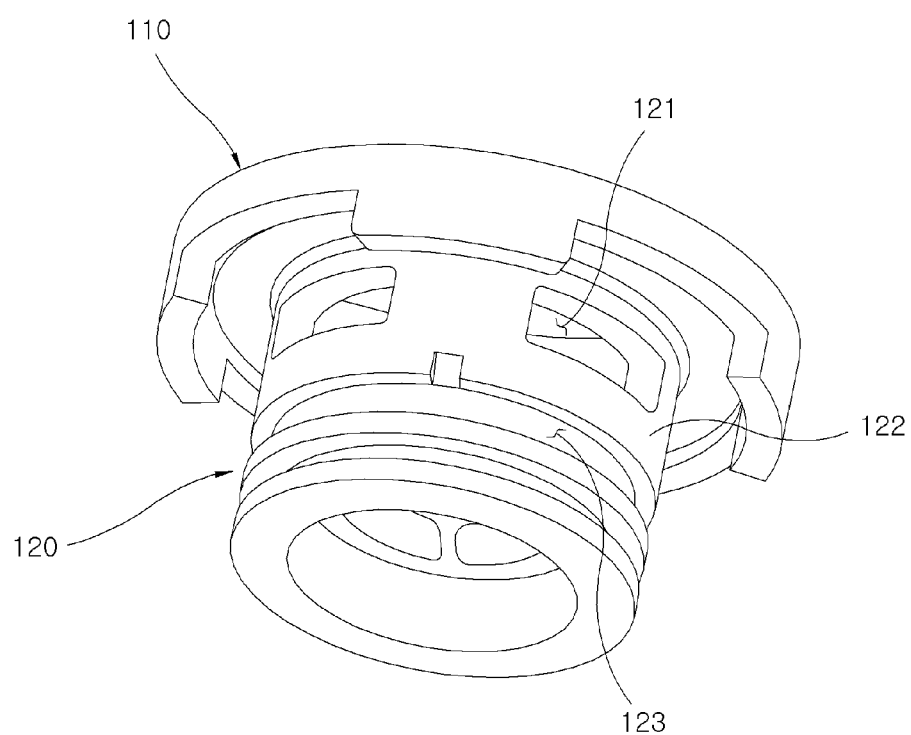
FIGS. 5 and 6 are diagrams separately showing each part of the one-way plug in accordance with embodiments of the present disclosure.
Figure 6:
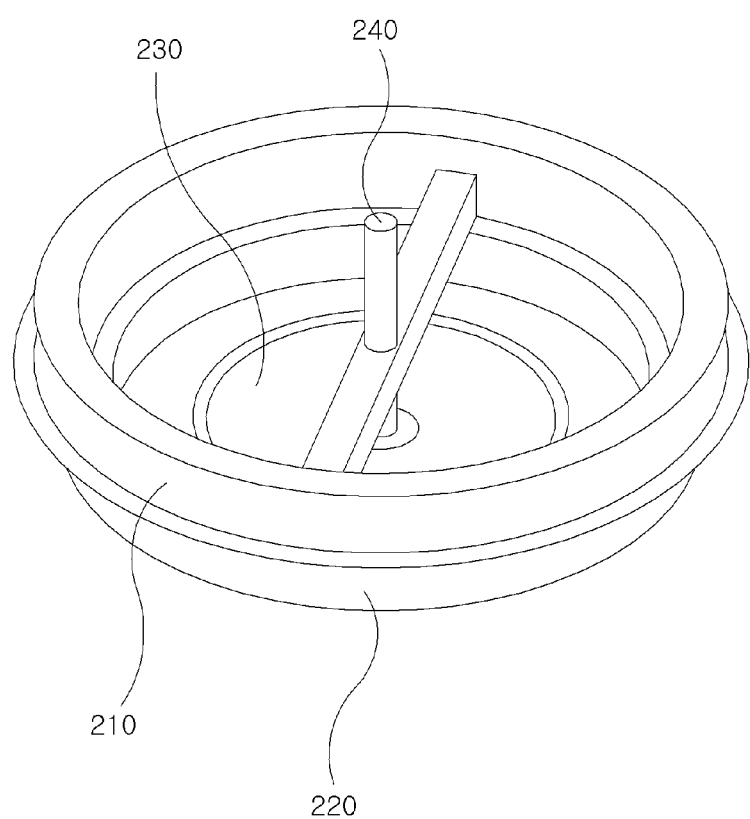

FIG. 3 is a diagram showing a one-way plug in accordance with embodiments of the present disclosure and FIG. 4 is a diagram showing a cross-sectional shape taken along line X-X of FIG. 3. In addition, FIGS. 5 and 6 are diagrams separately showing each part of the one-way plug in accordance with embodiments of the present disclosure.

Hereinafter, a one-way plug according to an embodiment of the present disclosure will be described with reference to FIGS. 3 to 6.

A one-way plug of the present disclosure is mounted to a drain hole of a vehicle body (B) and serves to improve the watertight properties from the outside to the inside and drain the water trapped therein to the outside, and particularly, may be assembled from the upper portion to the lower portion of the vehicle body (B) to be applicable to a closed section, and may move a sealing surface to a sidewall so that an upper stopper may overlap with the sealing surface of the vehicle body.

The one-way plug of embodiments of the present disclosure is formed by integrally coupling a valve body 200 to a housing 100 by double injection.

The housing 100 is composed of an upper stopper 110 and a lower body 120. The lower body 120 is formed of a cylindrical body formed with a hollow. The upper stopper 110 is formed to have a larger outer diameter than the outer diameter of the lower body 120 to be latched to the upper surface of the vehicle body (B) through the drain hole from the upper portion to the lower portion of the vehicle body (B), and thus is prevented from being separated downward.

The upper stopper 110 includes a plate 111, an overlap part 113, and a valve support part 114.

The plate 111 may be mostly flat, and may have a circular shape or a polygonal shape on the plane. In addition, the plate 11 may be mostly flat or may have a shape which is inclined downward in the direction of the center of the circle as in the example shown.

In addition, the overlap part 113 is formed by extending downward from the side of the plate in, and the overlap part 113 overlaps with the upper surface of the vehicle body (B) to be supported and sealed. In addition, the overlap part 113 is formed to extend from the plate 111 in a divided form.

The plate 111 is formed with an upper discharge hole 112 penetrated vertically, such that water trapped along the inclined surface of the plate 111 is collected at the center, and drained downward through the upper discharge hole 112.

The upper discharge hole 112 may be divided and formed in plural as shown in the drawing, and the valve support part 114 may extend downward from the plate 111 between the divided upper discharge holes 112, and may have a vertical hole formed at the center thereof.

More preferably, the upper discharge hole 112 is formed to extend from the center of the plate 111 downward, and a wing support part 240 of the valve body 200 to be described later is inserted into the vertical hole.

The lower body 120 has a sealing surface part 122 formed to extend from the lower surface of the upper stopper no in a cylindrical shape, and a plurality of side discharge holes 121 formed in the sealing surface part 122 to the side.

The sealing surface part 122 forms a sealing surface in contact with a flange (F) of the vehicle body (B) together with a sealing surface part 210 of the valve body 200 to be described later.

In addition, the lower portion of the sealing surface part 122 is formed with a groove part 123 along the outer circumference.

That is, the groove part 123 is formed to have a diameter smaller than that of the sealing surface part 122, and is formed in a state where a lower stopper part 220 of the valve body 200 to be described later has been inserted into the groove part 123.

In addition, a valve stopper 124 protruding inward, which is a hollow direction, is formed on the lower portion of the sealing surface part 122.

The valve stopper 124 serves to prevent the upward deformation in a wing part 230 of the valve body 200 to be described later.

The housing 100 is made of a hard material and is formed in a shape described above, and the shape of the valve body 200 is formed integrally by double injection by inserting the housing 100 thus produced into a mold.

The valve body 200 is made of a soft material.

The valve body 200 is composed of the sealing surface part 210, the lower stopper part 220, the wing part 230, and the wing support part 240.

The sealing surface part 210 and the lower stopper part 220 form an outline, the sealing surface part 210 is bonded to the circumference of the sealing surface part 122 of the lower body 120, and the lower stopper part 220 is formed on the lower portion of the sealing surface part 210, and has a shape which protrudes and expands inward and outward with respect to the sealing surface part 210, respectively.

Accordingly, the sealing surface part 210 may be coupled in contact with the inner surface of the flange (F) of the vehicle body (B) while having the same height as the sealing surface part 122 of the lower body 120, and the lower stopper part 220 has a shape which protrudes inward by the groove part 123 of the lower body 120, and is latched to the flange (F) by the shape which protrudes outward so that the coupled one-way plug is prevented from being separated upward. Accordingly, the lower stopper part 220 is matched with the cut surface of the flange (F) in the H direction, and overlaps with the side surface of the flange (F) to form the sealing surface.

In addition, the upper surfaces of the sealing surface part 122 of the lower body 120 and the sealing surface part 210 of the valve body 200 are spaced at a certain interval (d) apart from the upper surface of the vehicle body (B) to form a step. Here, the step interval (d) is preferably a curvature radius (R) or more of the bending surface of the flange (F).

In addition, the inner surface of the sealing surface part 122 of the lower body 120 is formed with the inclination of 40 degrees or less with respect to the vertical surface as shown in the drawing, thereby further facilitating more drainage.

The wing part 230 is formed to have the inner diameter larger than the inner diameter of the valve stopper 124 of the lower body 120 and smaller than the inner diameter of the sealing surface part 210, and is configured to contact the lower surface of the valve stopper 124. In addition, the wing part 230 is prepared in a form extending upward from the center of the wing part 230, and is supported by the wing support part 240 inserted into the vertical hole of the valve support part 114 of the upper stopper 110.

Accordingly, the soft wing part 230 may be elastically deformed, such that a portion of the wing part 230, except for the wing support part 240, is deformed downward by the water drained downward from the drain hole through the upper discharge hole 112, and thus enables drainage, and is elastically restored to a shape shown in the drawing when an external force disappears.

According to the one-way plug of embodiments of the present disclosure formed as described above, since the one-way plug may be assembled from the upper portion to the lower portion of the vehicle body to be applicable to the closed section, and may form the sealing surface to the sidewall, it is possible to facilitate the drainage even while securing the sealing performance.

As described above, although the present disclosure has been described with reference to the exemplary drawings, it is not limited to the described embodiments, and it is apparent to those skilled in the art that the present disclosure may be modified and changed variously without departing from the spirit and scope of the present disclosure. Accordingly, such modifications or changes should be included in the claims of the present disclosure, and the scope of the present disclosure should be construed based on the appended claims.

What is claimed is:

1. A one-way plug, comprising:
a housing comprising a plate, an upper stopper having an overlap part extending downward from a side of the plate, and a lower body having a sealing surface part formed to extend in a cylindrical shape with a hollow downward from the plate; and
a valve body provided in the hollow of the lower body and configured to cover the hollow, and having a wing part elastically deformed and configured to open the hollow,
wherein a lower portion of the sealing surface part is formed with a groove part having a smaller diameter than that of the sealing surface part along an outer circumference.

2. The one-way plug of claim 1, wherein an upper discharge hole is formed in the plate.

3. The one-way plug of claim 2, wherein:
the upper discharge hole is divided and formed in plural in the plate; and
the upper stopper further comprises a valve support part extending downward from a center of the plate and formed with a vertical hole in a longitudinal direction.

4. The one-way plug of claim 1, wherein the sealing surface part is formed with a side discharge hole.

5. The one-way plug of claim 1, wherein the lower portion of the sealing surface part is formed with a valve stopper protruding in a direction of the hollow.

6. The one-way plug of claim 1, wherein:
the upper stopper further comprises a valve support part extending downward from a center of the plate and formed with a vertical hole in a longitudinal direction; and
the valve body further comprises a wing support part extending upward from a center of the wing part and inserted into the vertical hole of the valve support part.

7. The one-way plug of claim 6, wherein the valve body further comprises:
a sealing surface part of the valve body in contact with the outer circumference of the sealing surface part of the lower body; and
a lower stopper part formed on the lower portion of the sealing surface part and having a shape protruding and expanding inward and outward with respect to the sealing surface part, respectively.

8. The one-way plug of claim 7, wherein the lower stopper part is inserted into the groove part.

9. The one-way plug of claim 7, wherein a height of the sealing surface part of the lower body and a height of the sealing surface part of the valve body are the same.

10. The one-way plug of claim 9, wherein when inserted into a drain hole formed in a vehicle body, the overlap part is configured to overlap with the upper surface of the vehicle body, and an upper surface of the sealing surface part of the lower body and an upper surface of the sealing surface part of the valve body are spaced at a certain interval apart from the upper surface of the vehicle body to form a step.

11. The one-way plug of claim 7, wherein the valve body is formed integrally with the housing by double injection.

12. The one-way plug of claim 11, wherein the valve body is made of a softer material than that of the housing.

13. A vehicle comprising:
a vehicle body having a drain hole;
a one-way plug mounted to the drain hole of the vehicle body, the one-way plug comprising:
a housing comprising a plate, an upper stopper having an overlap part extending downward from a side of the plate, and a lower body having a sealing surface part formed to extend in a cylindrical shape with a hollow downward from the plate; and
a valve body provided in the hollow of the lower body and configured to cover the hollow, and having a wing part elastically deformed and configured to open the hollow,
wherein a lower portion of the sealing surface part is formed with a groove part having a smaller diameter than that of the sealing surface part along an outer circumference.

14. The vehicle of claim 13, wherein an upper discharge hole is formed in the plate.

15. The vehicle of claim 14, wherein:
the upper discharge hole is divided and formed in plural in the plate; and the upper stopper further comprises a valve support part extending downward from a center of the plate and including a vertical hole in a longitudinal direction.

16. The vehicle of claim 13, wherein the sealing surface part is formed with a side discharge hole.

17. The vehicle of claim 13, wherein the lower portion of the sealing surface part includes a valve stopper protruding in a direction of the hollow.

18. The vehicle of claim 13, wherein:
the upper stopper further comprises a valve support part extending downward from a center of the plate and formed with a vertical hole in a longitudinal direction; and
the valve body further comprises:
  a wing support part extending upward from a center of the wing part and inserted into the vertical hole of the valve support part;
  a sealing surface part of the valve body in contact with the outer circumference of the sealing surface part of the lower body; and
  a lower stopper part formed on the lower portion of the sealing surface part, having a shape protruding and expanding inward and outward with respect to the sealing surface part, respectively, and inserted into the groove part.

* * * * *